(12) United States Patent
Ragonese

(10) Patent No.: US 11,360,322 B2
(45) Date of Patent: Jun. 14, 2022

(54) PIVOTABLE EYEGLASS FRAME WITH SHORTENED TEMPLE BAR AND ANCHORING PAD

(71) Applicant: Stephen Ragonese, Pelham, NH (US)

(72) Inventor: Stephen Ragonese, Pelham, NH (US)

( * ) Notice: Subject to any disclaimer, the term of this patent is extended or adjusted under 35 U.S.C. 154(b) by 108 days.

(21) Appl. No.: 17/019,488

(22) Filed: Sep. 14, 2020

(65) Prior Publication Data
US 2021/0080747 A1 Mar. 18, 2021

Related U.S. Application Data

(60) Provisional application No. 62/900,954, filed on Sep. 16, 2019.

(51) Int. Cl.
*G02C 1/06* (2006.01)
*G02C 5/00* (2006.01)
*G02C 5/08* (2006.01)

(52) U.S. Cl.
CPC ............... *G02C 1/06* (2013.01); *G02C 5/008* (2013.01); *G02C 5/08* (2013.01)

(58) Field of Classification Search
CPC . G02C 1/06; G02C 5/008; G02C 5/08; G02C 5/20; G02C 5/2263; G02C 5/143
See application file for complete search history.

(56) References Cited

U.S. PATENT DOCUMENTS

| 3,419,909 | A | | 1/1969 | Spain |
| 4,837,862 | A | * | 6/1989 | Heil ........................ A61F 9/045 2/454 |
| D342,080 | S | | 12/1993 | Cargle |
| 6,648,471 | B1 | * | 11/2003 | Dalrymple ............. G02C 3/003 351/111 |
| 7,165,838 | B1 | | 1/2007 | Sapp |
| 7,926,937 | B2 | | 4/2011 | Spinnato et al. |
| 9,134,544 | B2 | | 9/2015 | Rochford et al. |

* cited by examiner

*Primary Examiner* — James C. Jones
(74) *Attorney, Agent, or Firm* — Hsuanyeh Law Group PC

(57) ABSTRACT

The present disclosure provides a pivotable eyeglass frame. In one aspect, the pivotable eyeglass frame includes a rim capable of receiving two lenses therein, and two temple bars, each being rotatably coupled to the rim via a hinge and having an anchoring pad mechanically coupled to the temple bar via a stepper column such that the rim is pivotable about the stepper column in steps.

10 Claims, 9 Drawing Sheets

PIVOTABLE EYEGLASS FRAME WITH SHORTENED TEMPLE BAR AND ANCHORING PAD

RELATED APPLICATION

This application claims the benefit of priority to provisional application No. 62/900,954, filed Sep. 16, 2019, the entire contents of which are incorporated herein by reference for all purposes.

TECHNICAL FIELD

The present disclosure relates to a pivotable eyeglass frame. More particularly, the present disclosure relates to a pivotable eyeglass frame with shortened temple bars each having a suction cup or an anchoring pad at the temple tip.

BACKGROUND

A conventional eyeglass frame includes two temple bars each having an angled or curved earpiece that can stabilize the eyeglass frames at the user's ears. Users of any form of eyewear, for example, sunglasses or magnifying glasses, often need to temporally raise the eyeglass frame from its normal position (e.g., settled on the nose) to a raised position (e.g., settled between the eyebrows and the hairline or above the hairline) so as to expose their eyeballs without removing such eyewear from the users' face. When a user raises the eyewear to this vantage point while also preventing it from dropping back down, the eyewear needs to be raised about 75-90 degrees in order for the eyeglass frame to rest on top of the user's head or cranium.

Because the angled or curved earpieces of conventional eyeglass frames are relatively rigid and inflexible, the eyeglass frame raised to such a higher position becomes unstable and would easily fall off from the face. As such, it opens up the possibility for eyewear damages due to, for example, the over-extension/over-stretching of the hinges and the complete falling off from the user's face or head.

Moreover, the temple arms (especially the temple tips) at the raised position cause discomfort to the user's ears. Accordingly, when necessary, the user may simply remove the eyewear from their face and inadvertently leave the eyewear behind, thereby incurring additional cost for replacing the eyewear.

Accordingly, there is a need to develop a new eyeglass frame that is pivotable between a normal position and a raised position without sacrificing its stability on the user's face.

SUMMARY

In view of the above and other objectives, the eyeglass frame of the present disclosure includes temple bars having a reduced length (about 50% of that of conventional eyeglass frames) without the conventional angled/curved temple tips. In addition, a pivot structure can be formed and located inside of the shortened temple bars, thereby making contact with the wearer's physical anatomical temples of one's cranium. This "pivot point" (in combination with tension-type hinges) allows the user to simply push the eyeglass frame upward for only 2-3 inches using a single fingertip, without the need to push it up to the conventional "resting position" of 7-10 inches (or 75-90 degrees needed to prevent downward slippage of the eyewear).

In one aspect, the present disclosure provides a pivotable eyeglass frame, comprising a rim having two lenses embedded therein, and two temple bars, each being rotatably coupled to the rim via a hinge and comprising a suction cup attached to a respective temple tip of the temple bars.

In one embodiment, the suction cup comprises a head having a cylindrical shape with a narrowing waist portion, and a frustoconical portion thereby securely mounting the suction cup to a temple portion of a user's face.

In one embodiment, the frustoconical portion of suction cup is surface treated to enhance adhesion of the suction cup on the user's temple portion.

In one embodiment, each of the temple bars comprises a through hole proximate its temple tip and wherein the suction cup is embedded in the through hole.

In one embodiment, the suction cup is securely fastened to the temple bar by engaging the waist portion of the head with the through hole.

In one embodiment, each of the temple bars has a length less than one half of a width of the rim.

In one embodiment, the suction cup is made of a plastic material.

In one embodiment, the suction cup comprises a mechanical mechanism at the narrowing waist portion, such that back and forth rotations of the pivotable eyeglass frame about the suction cup is intermittently stopped once every 15-45 degrees.

In another aspect, the present disclosure provides a pivotable eyeglass frame, comprising: a rim capable of receiving two lenses therein, and two temple bars, each being rotatably coupled to the rim via a hinge and having an anchoring pad mechanically coupled to the temple bar via a stepper column such that the rim is pivotable about the stepper column in steps.

In one embodiment, each of the two temple bars has a length less than one half of a width of the rim.

In one embodiment, each of the temple bars comprises a main body, a protruded knuckle at an end of the main body, a through hole at a central portion of the main body, and an end hole at an opposite end of the main body, wherein the through hole and the end hole are communicably connected within the main body.

In one embodiment, the knuckle portion is rotatably coupled with a side of the rim using a pin, thereby forming the hinge.

In one embodiment, the stepper column comprises: a base securely coupled to the anchoring pad; and a gear pillar formed on the base, the gear pillar being inserted in the through hole of the main body and comprising a plurality of gear teeth.

In one embodiment, a side surface of the through hole comprises one or more trenches having a shape complimentary to that of the gear teeth.

In one embodiment, the pivotable eyeglass frame of the present disclosure further comprises a headless screw movably secured in the end hole and a spring within the end hole such that the spring exerts an elastic force from the headless screw to push the gear pillar against the trenches.

In one embodiment, the base comprises a plurality of coupling holes and the anchoring pad comprises a plurality of protrusions, each of the protrusions being securely inserted in a respective one of the coupling holes.

In one embodiment, each of the protrusions has a mushroom shape and each of the coupling holes has a shape that is complimentary to that of a respective one of the protrusions.

In one embodiment, the protrusions are evenly distributed and arranged on a surface of the anchoring pad in circle.

In one embodiment, the anchoring pad is made of a silicon material and the stepper column is made of a PET material.

DETAILED DESCRIPTION

Figure 1:
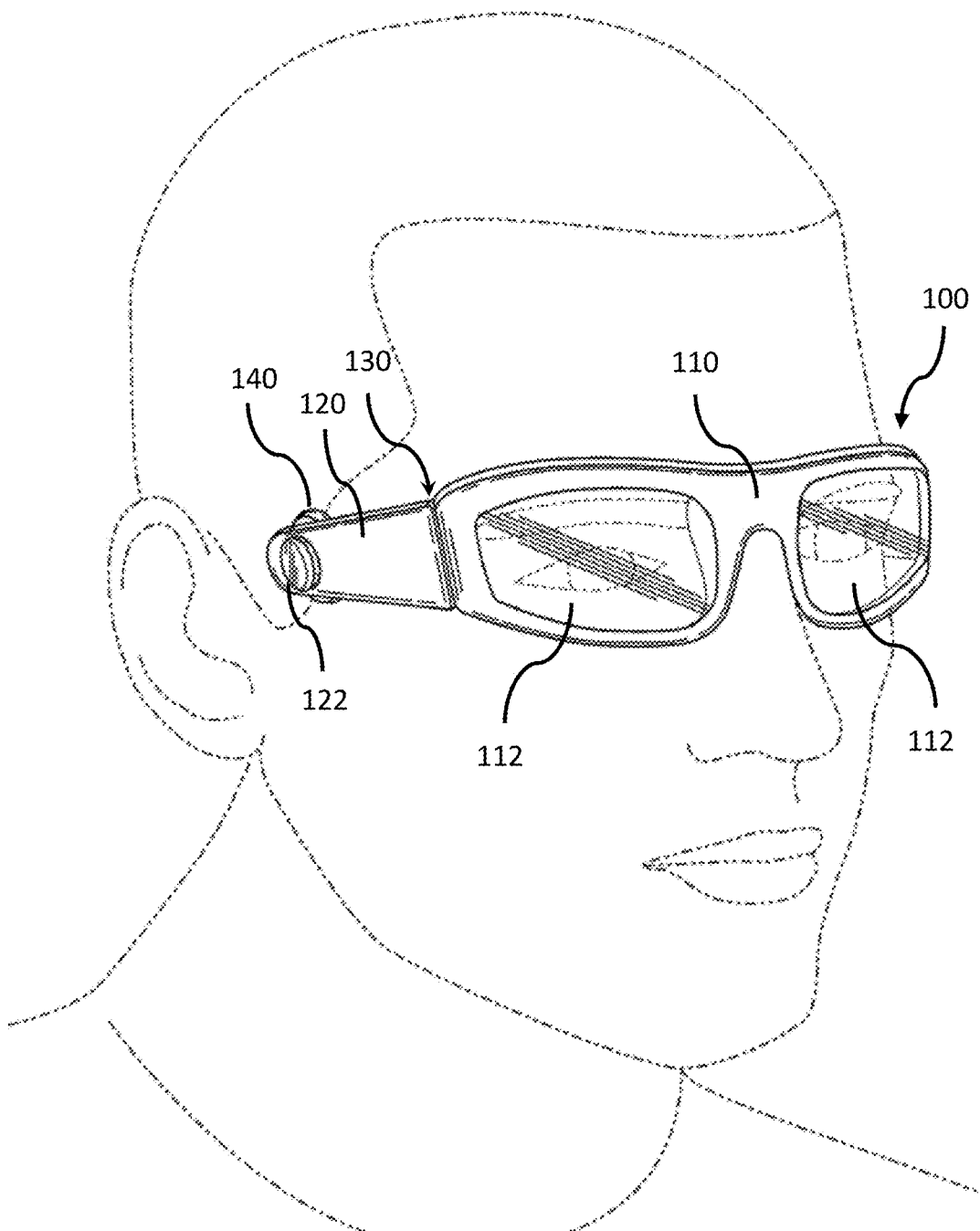
FIG. 1 illustrates a front perspective view of a pivotable eyeglass frame, in accordance with a first embodiment of the present disclosure.

Referring to FIGS. 1 through 9, there are illustrated various views of a pivotable eyeglass frame 100, in accordance with a first embodiment of the present disclosure. As shown, pivotable eyeglass frame 100 comprises a rim 110 with two lenses 112 embedded therein, and two temple bars 120, each being rotatably coupled to rim 110 via a hinge 130. Unlike the temple bars of a conventional eyeglass frame, temple bars 120 of the present disclosure are shorter in length and include a suction cup 140 attached to a respective temple tip 122 of temple bars 120. Although suction cup 140 is shown and described, it is appreciated that any suitable anchoring mechanism that holds an end of temple bars 120 at the temple portion of a user's face and allows eyeglass frame 100 to pivot from a normal position to a raised position can be used in place of suction cup 140, as further detailed below.

Figure 2:
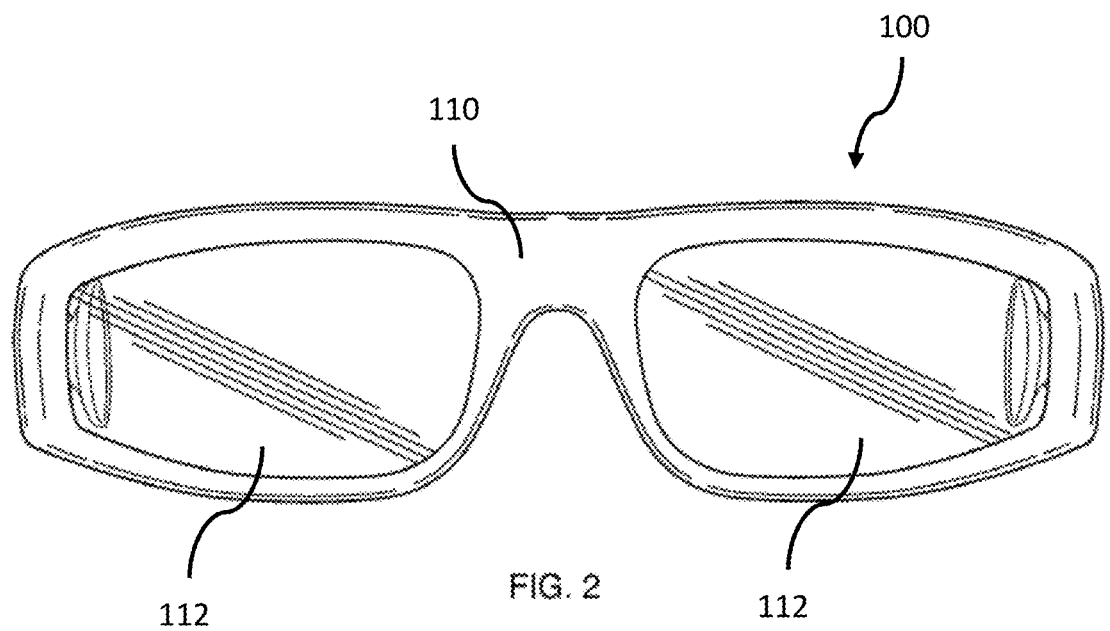
FIG. 2 illustrates a front elevational view of the pivotable eyeglass frame as shown in FIG. 1.
Figure 3:
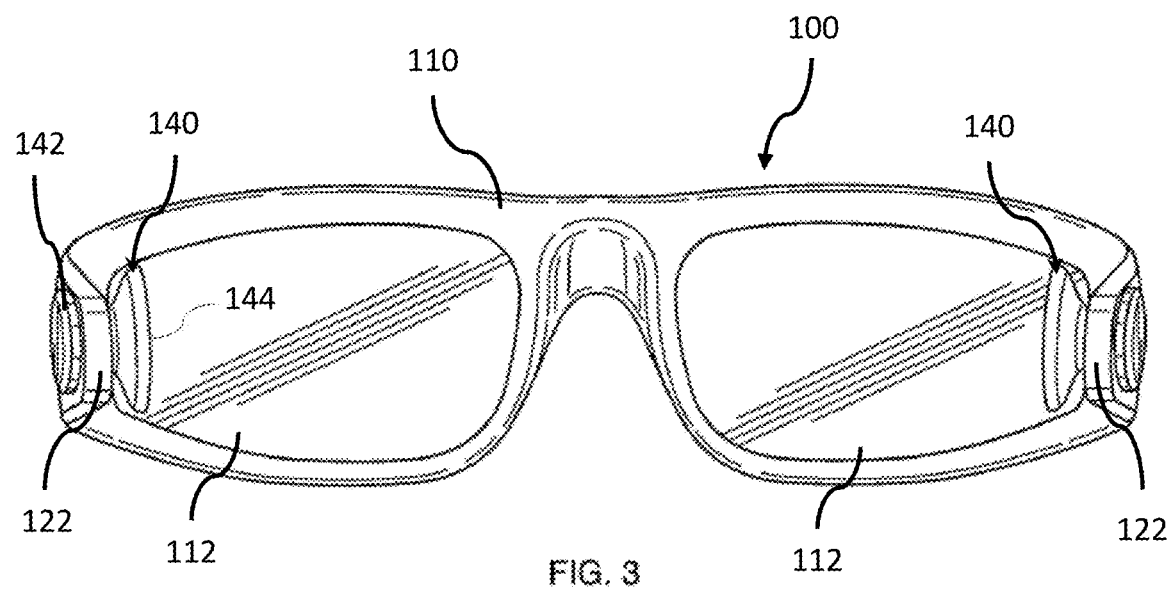
FIG. 3 illustrates a rear elevational view of the pivotable eyeglass frame as shown in FIG. 1.

As shown in FIGS. 2 and 3, in this embodiment, suction cup 140 comprises a head 142 having a substantially cylindrical shape with a narrowing waist portion, and a frustoconical portion 144 to securely mount suction cup 140 to a temple portion of the user's face by means of vacuum or in any other suitable manner, such as, friction, adhesion, etc.

Figure 4:
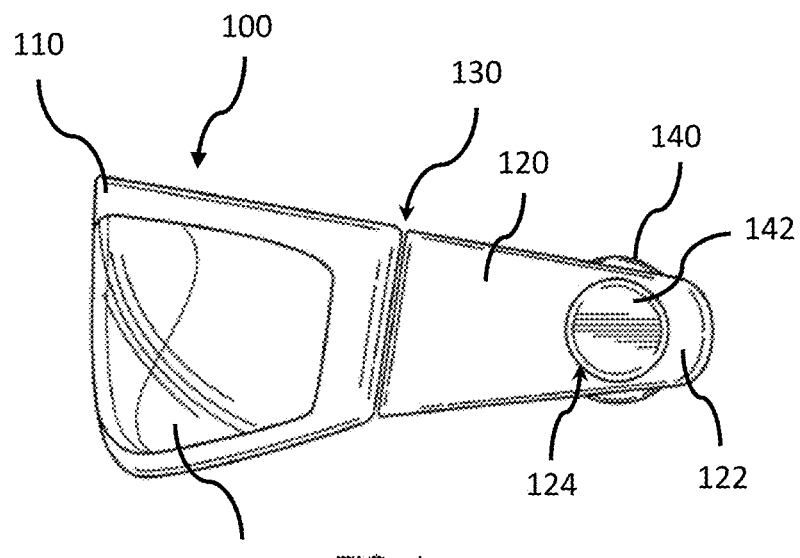
FIG. 4. illustrates a right-side elevational view of the pivotable eyeglass frame as shown in FIG. 1.
Figure 5:
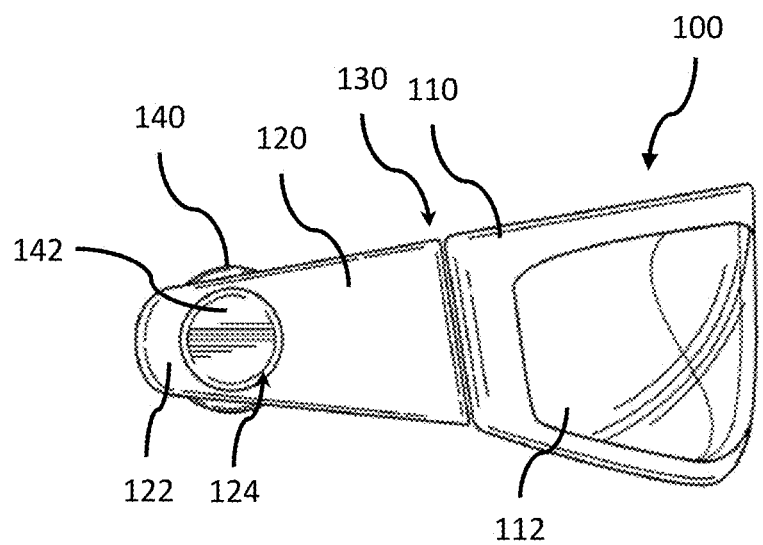
FIG. 5 illustrates a left-side elevational view of the pivotable eyeglass frame as shown in FIG. 1.
Figure 6:
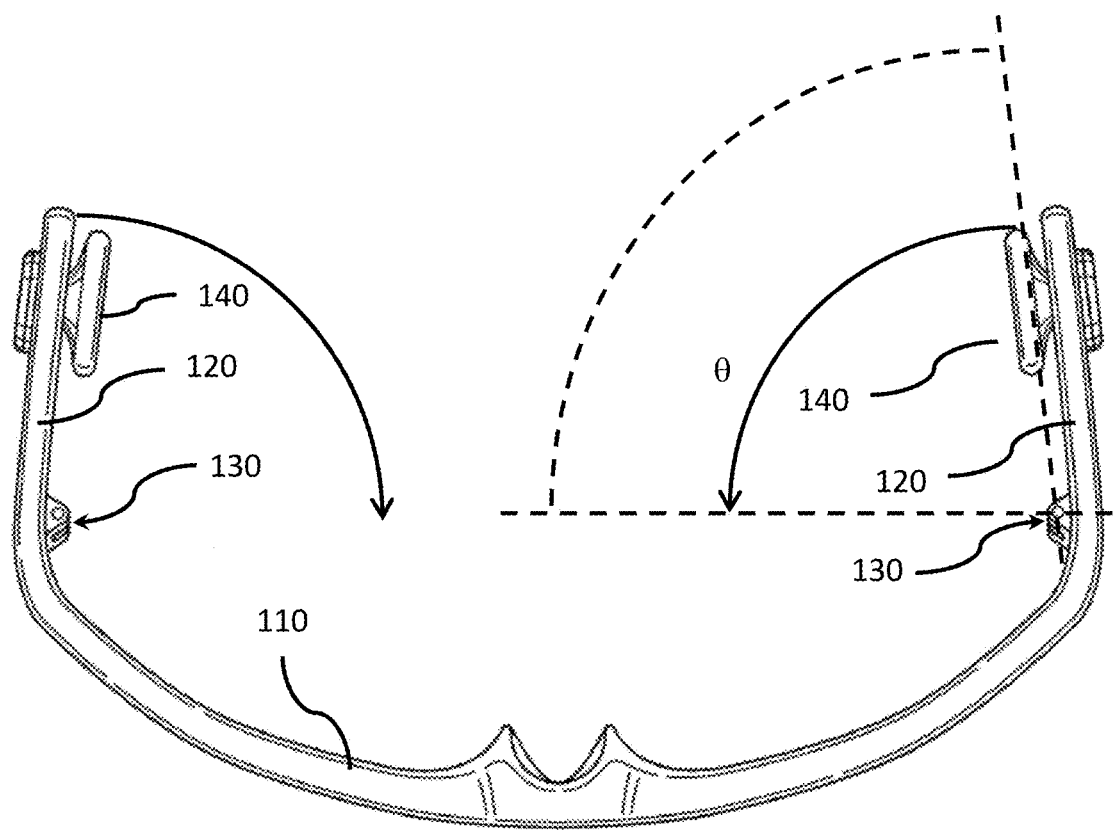
FIG. 6 illustrates a top plan view of the pivotable eyeglass frame as shown in FIG. 1.
Figure 7:
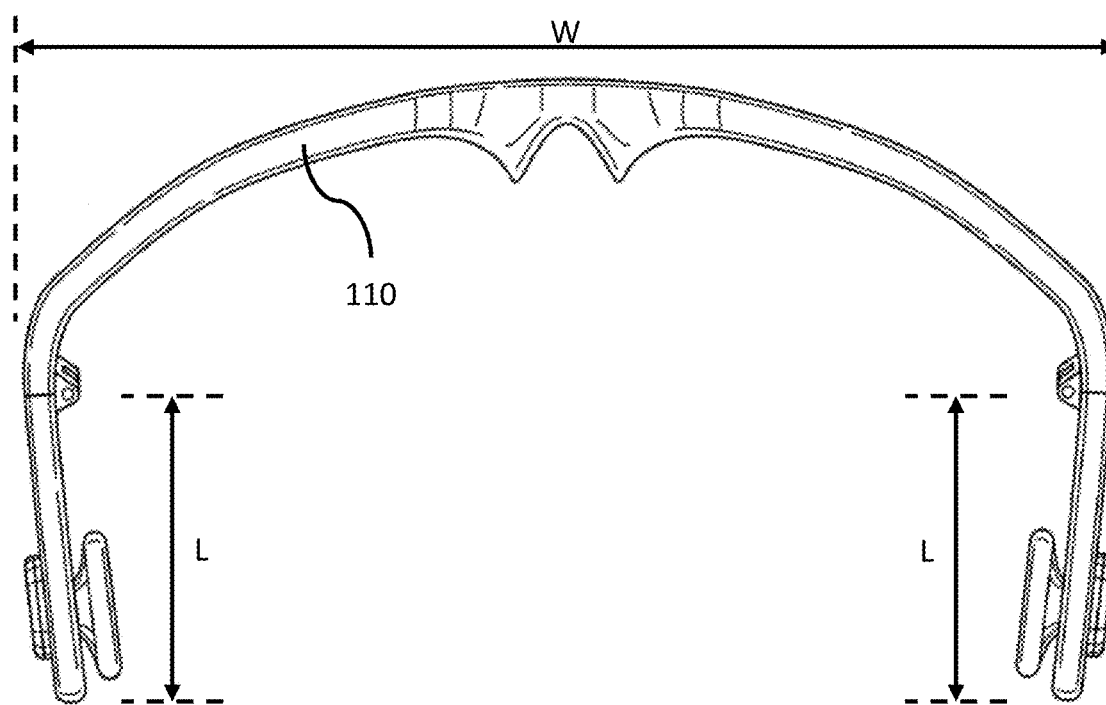
FIG. 7 illustrates a bottom plan view of the pivotable eyeglass frame as shown in FIG. 1.

As shown in FIGS. 4 and 5, in this embodiment, through holes 124 having a circular shape are formed on temple bars 120 proximate temple tips 122. It is appreciated that, in other embodiments, through holes 124 may have any other suitable shapes, such as, a square shape, a rectangular shape, a triangular shape, a trapezoid shape, a star shape, and the like. In this embodiment, suction cup 140 is firmly attached to temple bar 120 by engaging the waist portion of head 142 with through hole 124. In this embodiment, suction cup 140 may be made of rubber or other plastic material. Additionally, frustoconical portion 144 of suction cup 140 (particular the inner surface that would contact the temple portion of the user's face) can be surface treated to enhance adhesion of suction cup 140 on the user's temple portion As shown in FIGS. 6 and 7, in this embodiment, left and right temple bars 120 can be rotated clockwise or counterclockwise about hinge 130 for an angle θ of approximately 90 degrees (more or less) between an expanded position and a folded position. In this embodiment, each of the left and right temple bars 120 is configured to have a length L less than about one half of the width W of rim 110, such that left and right temple bars 120 do not cross nor touch upon each other after being rotated to the folded position. In this embodiment, when eyeglass frame 100 is worn on a user's face, the left and right temple bars 120 in the expanded position can exert force on the user's temple such that suction cups 140 can be securely mounted and/or attached to the user's temple.

Figure 8:
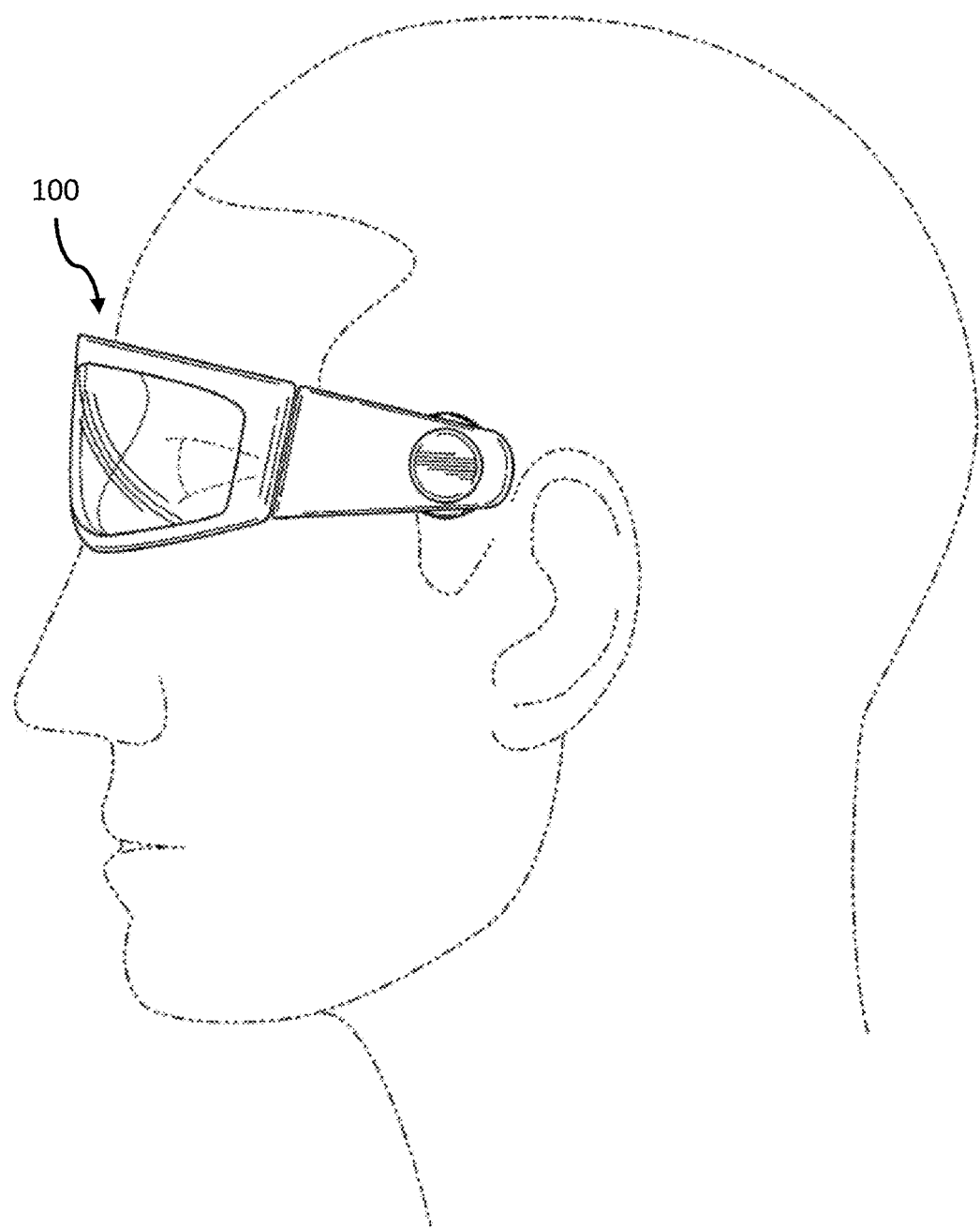
FIG. 8 illustrates a right-side view of the pivotable eyeglass frame in a normal position, in accordance with the first embodiment of the present disclosure.
Figure 9:
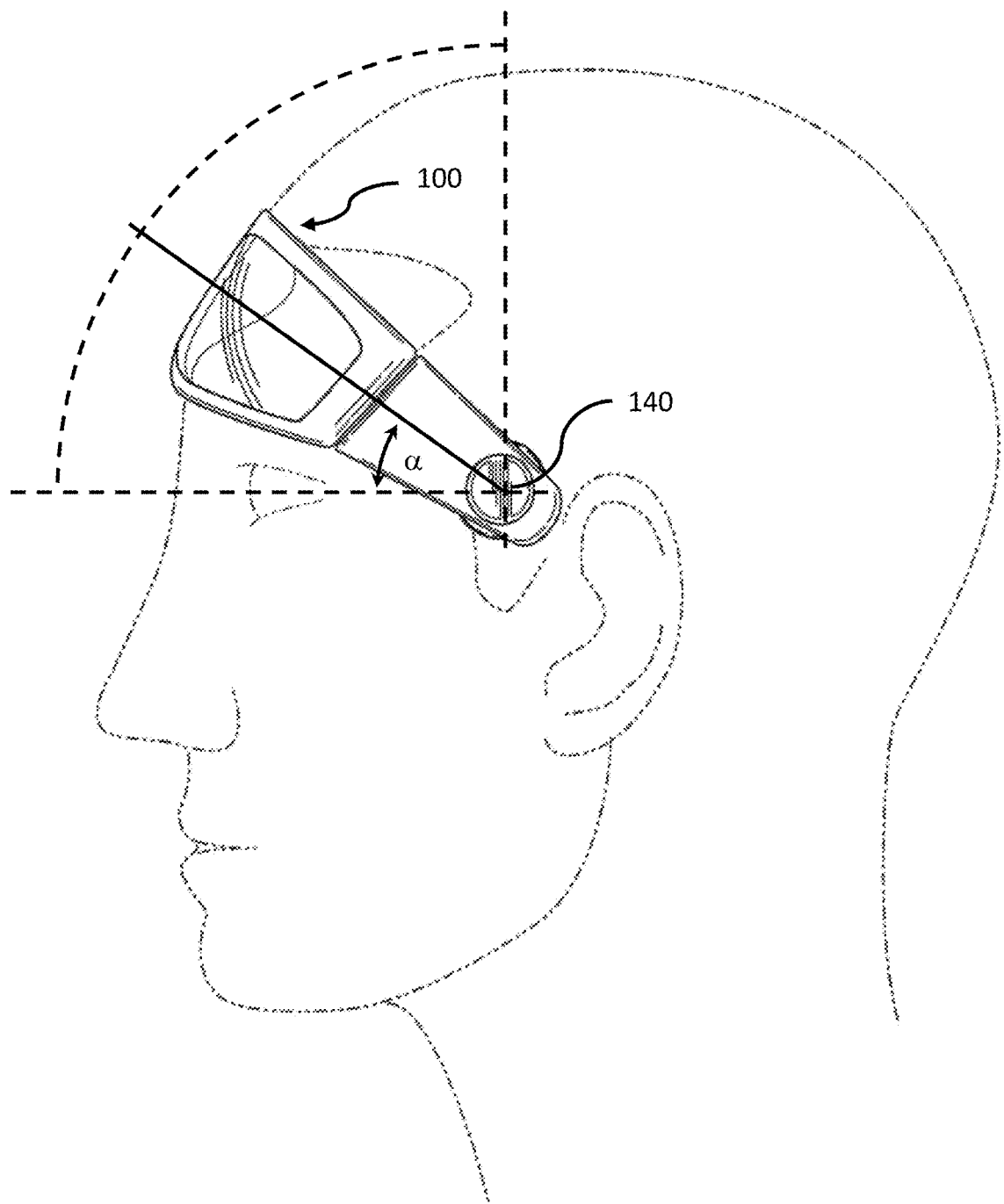
FIG. 9 illustrates a right-side view of the pivotable eyeglass frame in a raised position, in accordance with the first embodiment of the present disclosure.

As shown in FIGS. 8 and 9, pivotable eyeglass frame 100 can be rotated or pivoted about suction cups 140 for an angle α (e.g., 15-45 degrees) from a normal position (e.g., settled on the nose, as shown in FIG. 8) to a raised position (e.g., between the eyebrows and the hairline or above the hairline, as shown in FIG. 9). In this embodiment, suction cup 140 comprises a mechanical mechanism at the narrowing waist portion, such that back and forth rotation of pivotable eyeglass frame 100 about suction cups 140 can be intermittently stopped once every 15-45 degrees, for example.

Figure 10:
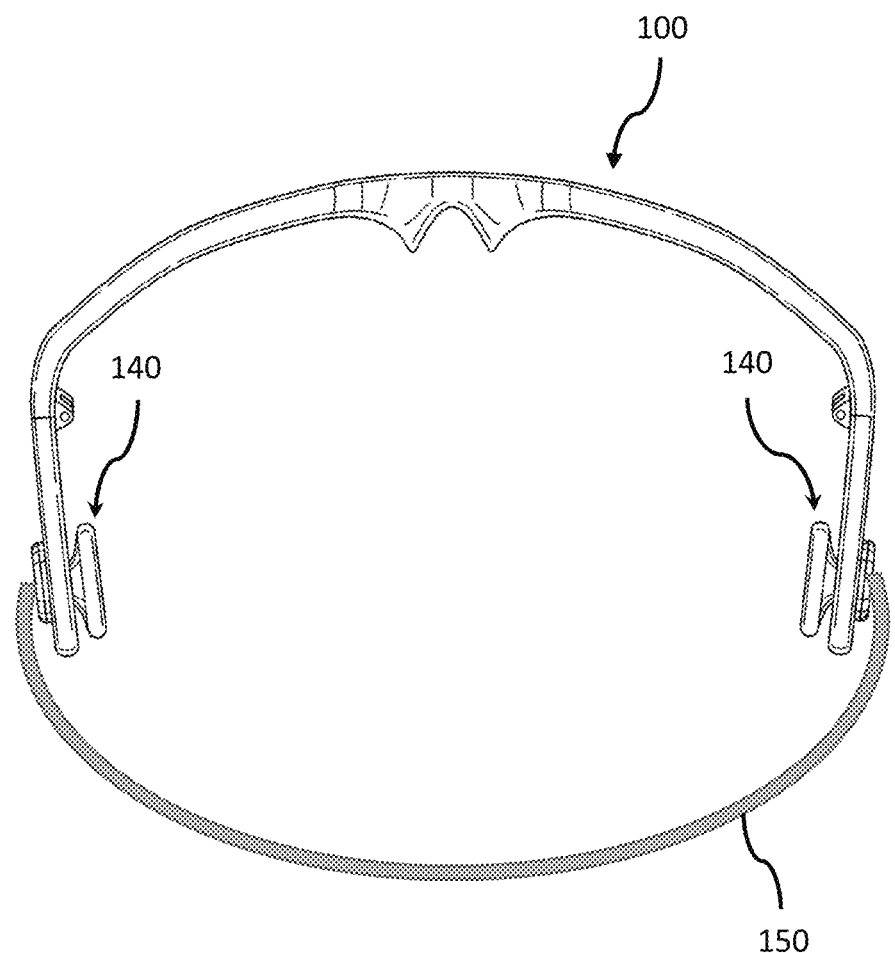
FIG. 10 illustrates a pivotable eyeglass frame, in accordance with an alternative embodiment of the present disclosure.

Referring to FIG. 10, there is illustrated a pivotable eyeglass frame 100, in accordance with an alternative embodiment of the present disclosure. As shown, in this alternative embodiment, a compressing bar 150 made of an elastic material may be optionally added to increase the compression of suction cups 140 toward the user's head. In this embodiment, compressing bar 150 can be worn and routed behind the user's head. With the assistance of compressing bar 150, pivotable eyeglass frame 100 can be better mounted to the user's temple portion.

Figure 11:
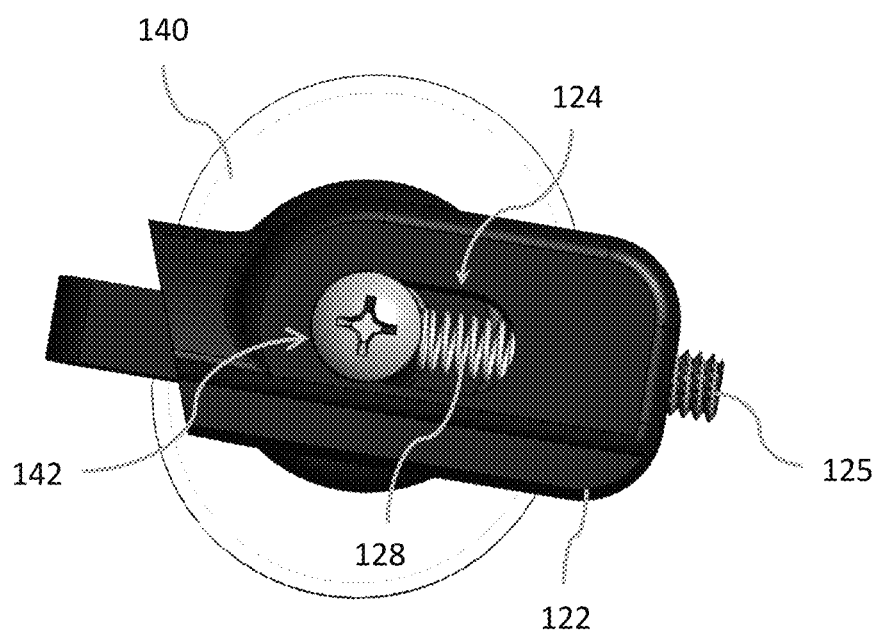
FIG. 11 illustrates an enlarged view of a suction cup attached to a temple tip in accordance with an alternative embodiment of the present disclosure.

Referring to FIG. 11, there is illustrated an enlarged view of suction cup 140 attached to temple tip 122 in accordance with an alternative embodiment of the present disclosure. As shown, temple tip 122 includes a through hole 124, where head 142 of suction cup 140 can be inserted therein and secured in position using a fastener 145, such as a Phillips screw. In this embodiment, through hole 124 has a longitudinal oval shape such that head 142 of suction cup 140 can slide therein, so as to adjust the mounting location and be securely fastened in position using a headless screw 125. In this embodiment, a spring 128 can be inserted in through hole 124 along its longitudinal direction to provide restoration force as one adjusts the location of suction cup 140 and/or as an intermittent stepper.

Figure 12:
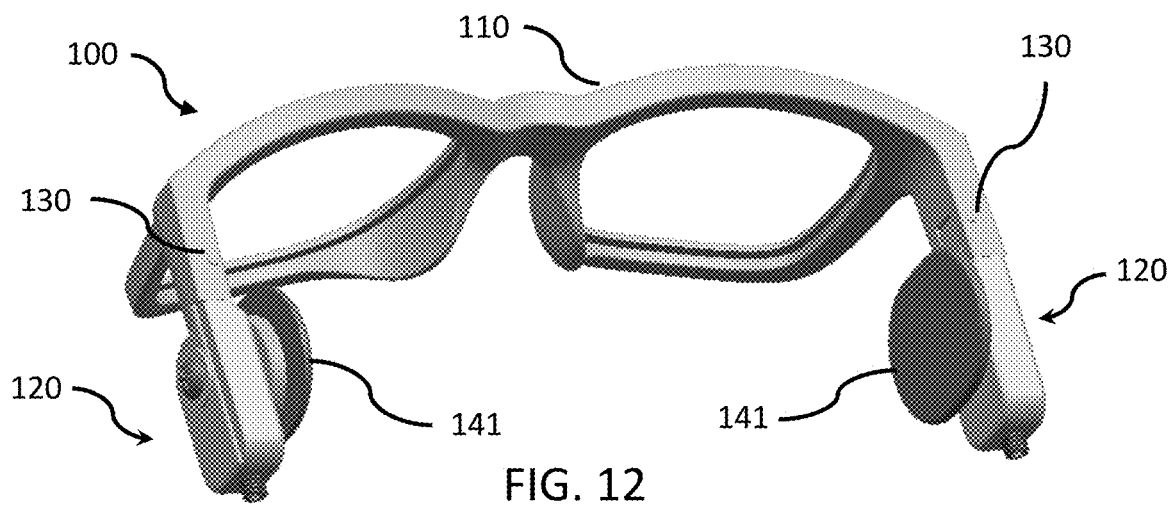
FIG. 12 illustrates a perspective view of a pivotable eyeglass frame, in accordance with a second embodiment of the present disclosure.
Figure 13:
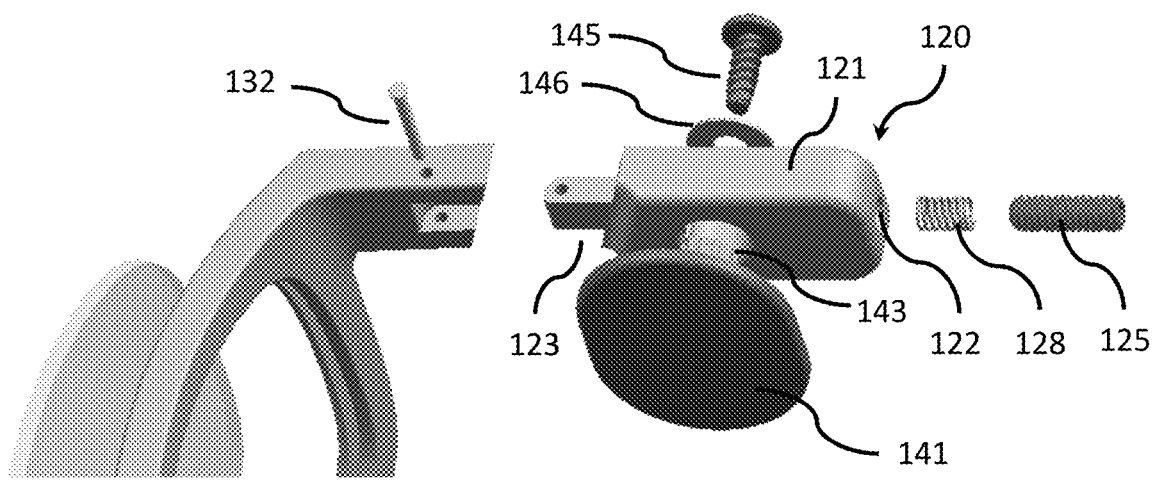
FIG. 13 illustrates an explosive view of a temple bar of the pivotable eyeglass frame as shown in FIG. 12.
Figure 14:
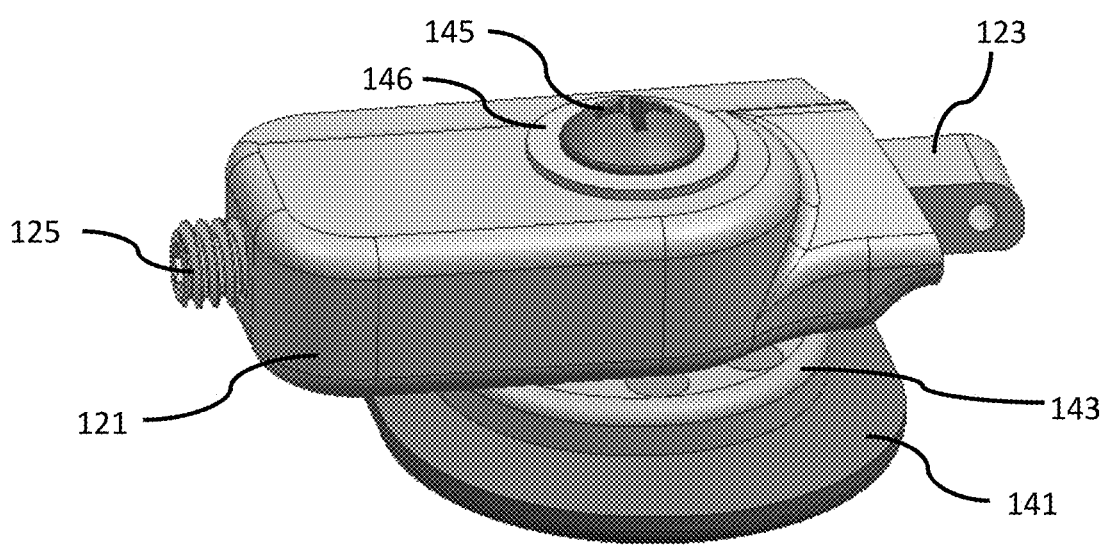
FIG. 14 illustrates an enlarged view of the temple bar as shown in FIG. 12.

FIG. 12 illustrates a perspective view of a pivotable eyeglass frame 100, in accordance with a second embodiment of the present disclosure. FIG. 13 illustrates an explosive view of a temple bar 120 of pivotable eyeglass frame 100 as shown in FIG. 12. FIG. 14 illustrates an enlarged view of temple bar 120 as shown in FIG. 12.

Referring to FIGS. 12, 13, and 14, pivotable eyeglass frame 100 comprises a rim 110 capable of receiving two lenses therein and two temple bars 120, each being rotatably coupled to left and right sides of rim 110 via a hinge 130. As discussed above, temple bars 120 of the present disclosure are shorter in length than conventional temple bars.

As shown in FIG. 12, temple bars 120 are pivoted to an expanded position. As shown in FIGS. 13 and 14, each temple bar 120 comprises a main body 121, a protruded knuckle 123 at an end of main body 121, a through hole 124 at a central portion of main body 121, and an end hole 122 at an opposite end of main body 121. In this embodiment, through hole 124 and end hole 122 are communicably connected to each other within main body 121. Knuckle portion 123 can be rotatably engaged with a side of rim 110 via a pin 132 (or bolt), thereby forming hinge 130.

An anchoring pad 141 is mechanically coupled to a stepper column 143 which can be loosely inserted in through hole 124 of main body 121 and secured in position using a fastener 145 (e.g., a Phillips screw) and a washer 146, so as to prevent stepper column 143 from being accidentally removed from the through hole 124. In this embodiment, diameter of through hole 124 is slightly greater than that of the stepper column 143. A headless screw 125 can push spring 128 into end hole 122, such that an elastic force is exerted on a curved side of stepper column 143. As further detailed below, the curved side of stepper column 143 comprises multiple gear teeth, which can be served as steppers at intermittent rotational steps. In one embodiment, stepper column 143 has twelve gear teeth, such that rotation of the pivotable eyeglass frame about stepper column 143 can be intermittently stopped once every 30 degrees (i.e., 360 degrees divided by 12 gear teeth equals 30 degrees). In various embodiments, stepper column 143 may comprise any suitable number of gear teeth (e.g., six, eight, ten, etc.).

Figure 15A:
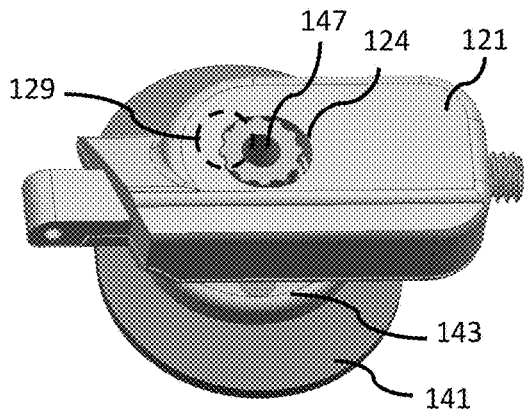
FIGS. 15A through 15E illustrate a perspective view of component parts of the temple bar of the pivotable eyeglass frame as shown in FIG. 12.

FIGS. 15A through 15E illustrate a perspective view of component parts of temple bar 120 of pivotable eyeglass frame 100 as shown in FIG. 12. Referring to FIG. 15A, a top portion of stepper column 143 is exposed after fastener 145 and washer 146 in FIG. 14 are removed. As shown in FIG. 15A, stepper column 143 comprises a central hole 147, so as to securely receive fastener 145 therein. In addition, the inner wall of through hole 124 of main body 121 includes one or more trenches 129. Spring 128 inserted in end hole 122 can cause the gear teeth of stepper column 143 being pushed against trenches 129, such that pivotable eyeglass frame 100 can be rotated about stepper column 143 in intermittent steps.

In this embodiment, the rotation tightness about stepper column 143 can be adjusted using headless screw 125. For example, turning headless screw 125 slightly into end hole 122 results in spring 128 exerting more force on the gear teeth of stepper column 143. As a result, more torque is required to move the gear teeth of stepper column 143 from one trench to another, thereby making it more difficult to rotate pivotable eyeglass frame 100 about stepper column 143. Likewise, turning headless screw 125 slightly out of end hole 122 results in spring 128 exerting less force on the curved surface of stepper column 143, thereby making it less difficult to rotate pivotable eyeglass frame 100 about stepper column 143.

Figure 15B:
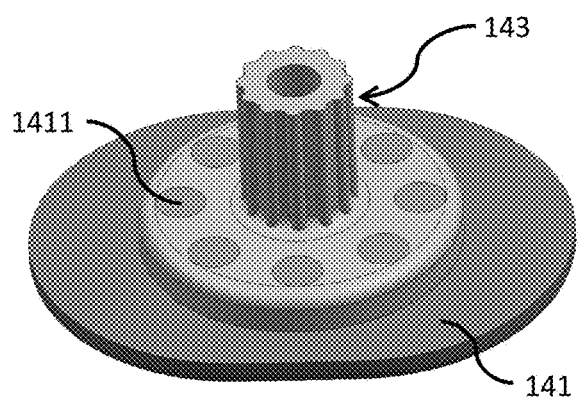
Figure 15C:
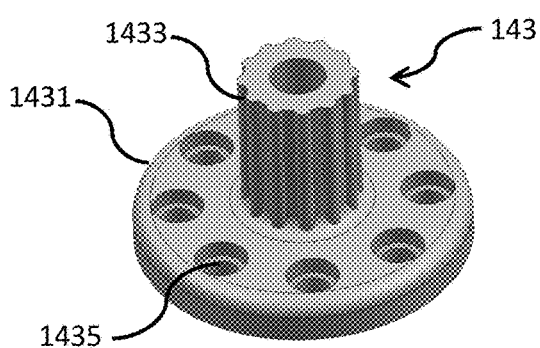
Figure 15D:
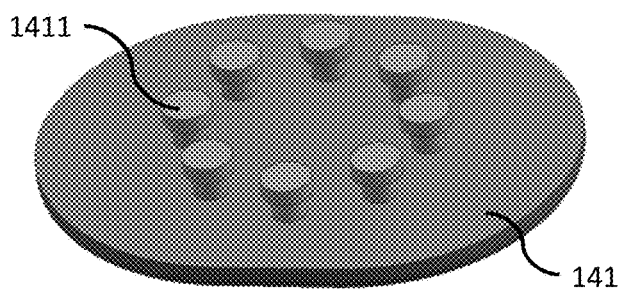
Figure 15E:
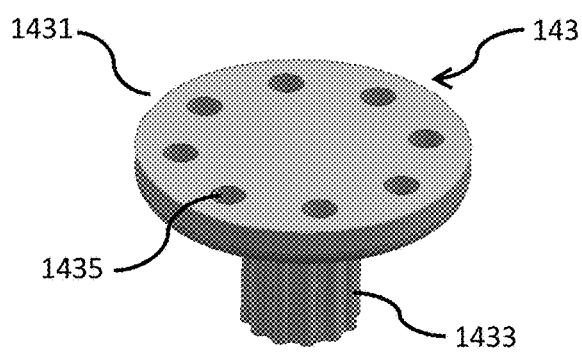

FIG. 15B illustrates a perspective view of anchoring pad 141 in combination with stepper column 143 removed from through hole 124 of main body 121. FIG. 15C illustrates a perspective view of stepper column 143. FIG. 15D illustrates a perspective view of anchoring pad 141. FIG. 15E illustrates another perspective view of stepper column 143.

Referring to FIGS. 15B through 15E, in this embodiment, anchoring pad 141 and stepper column 143 are combined through a plurality of protrusions 1411 formed on a surface of anchoring pad 141. As shown in FIG. 15C, in this embodiment, eight protrusions 1411, each having a mushroom shape, are formed on anchoring pad 141 and evenly distributed and arranged in circle. It is appreciated that any suitable number of protrusions can be formed on anchoring pad 141 with any suitable arrangements and/or shapes. Anchoring pad 141 and protrusions 1411 can be made of a silicon material and/or any other suitable materials, such as, soft plastic.

As shown in FIGS. 15C and 15E, stepper column 143 comprises a base 1431 and a gear pillar 1433 having a plurality of gear teeth capable of being engaged with trenches 129 of through hole 124. Gear pillar 1431 is formed on base 1431 and concentric with base 1431. Base 1431 has a diameter greater than that of gear pillar 1433. In this embodiment, eight coupling holes 1435 having a shape complimentary to that of protrusions 1411 of anchoring pad 141 are formed on base 1431. Stepper column 143 can be made of a PET (polyethylene terephthalate) material and/or any other suitable materials, such as, hard plastic, metal, etc.

In one embodiment, the combination of anchoring pad 141 and stepper column 143 can be manufactured by (1) forming stepper column 143 by injection molding a PET material and (2) forming anchoring pad 141 by insert molding a silicon material.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. A pivotable eyeglass frame, comprising:
 a rim capable of receiving two lenses therein, and
 two temple bars, each being rotatably coupled to the rim via a hinge and having an anchoring pad mechanically coupled to the temple bar via a stepper column such that the rim is pivotable about the stepper column in steps,
 wherein the stepper column comprises:
  a base securely coupled to the anchoring pad; and
  a gear pillar formed on the base, the gear pillar being loosely inserted in the through hole of the main body and comprising a plurality of gear teeth.

2. The pivotable eyeglass frame of claim 1, wherein each of the two temple bars has a length less than one half of a width of the rim.

3. The pivotable eyeglass frame of claim 1, wherein each of the temple bars comprises a main body, a protruded knuckle at an end of the main body, a through hole at a central portion of the main body, and an end hole at an opposite end of the main body, wherein the through hole and the end hole are communicably connected within the main body.

4. The pivotable eyeglass frame of claim 3, wherein the knuckle portion is rotatably coupled with a side of the rim using a pin, thereby forming the hinge.

5. The pivotable eyeglass frame of claim 1, wherein a side surface of the through hole comprises one or more trenches having a shape complimentary to that of the gear teeth.

6. The pivotable eyeglass frame of claim 5, further comprising a headless screw movably secured in the end hole and a spring within the end hole such that the spring exerts an elastic force from the headless screw to push the gear pillar against the trenches.

7. The pivotable eyeglass frame of claim 1, wherein the base comprises a plurality of coupling holes and the anchoring pad comprises a plurality of protrusions, each of the protrusions being securely inserted in a respective one of the coupling holes.

8. The pivotable eyeglass frame of claim 7, wherein each of the protrusions has a mushroom shape and each of the coupling holes has a shape that is complimentary to that of a respective one of the protrusions.

9. The pivotable eyeglass frame of claim 7, wherein the protrusions are evenly distributed and arranged on a surface of the anchoring pad in circle.

10. The pivotable eyeglass frame of claim 1, wherein the anchoring pad is made of a silicon material and the stepper column is made of a PET material.

\* \* \* \* \*